United States Patent
O'Neill et al.

(10) Patent No.: US 12,528,996 B2
(45) Date of Patent: Jan. 20, 2026

(54) LARGE PORE ZEOLITIC CATALYSTS AND USE THEREOF IN CATALYTIC CRACKING

(71) Applicant: ExxonMobil Technology and Engineering Company, Annandale, NJ (US)

(72) Inventors: Brandon J. O'Neill, Spring, TX (US); Joseph M. Falkowski, Hampton, NJ (US); Allen W. Burton, Stewartsville, NJ (US); Scott J. Weigel, Allentown, PA (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 238 days.

(21) Appl. No.: 17/634,961

(22) PCT Filed: Jul. 14, 2020

(86) PCT No.: PCT/US2020/041867
§ 371 (c)(1),
(2) Date: Feb. 11, 2022

(87) PCT Pub. No.: WO2021/034425
PCT Pub. Date: Feb. 25, 2021

(65) Prior Publication Data
US 2022/0380686 A1 Dec. 1, 2022

Related U.S. Application Data

(60) Provisional application No. 62/889,126, filed on Aug. 20, 2019.

(51) Int. Cl.
*C10G 65/12* (2006.01)
*B01J 8/08* (2006.01)
(Continued)

(52) U.S. Cl.
CPC ............ *C10G 47/18* (2013.01); *B01J 8/08* (2013.01); *B01J 29/74* (2013.01); *B01J 35/643* (2024.01);
(Continued)

(58) Field of Classification Search
CPC ............ C10G 47/18; C10G 2300/1037; C10G 2300/301; C10G 47/16; C10G 47/20;
(Continued)

(56) References Cited

U.S. PATENT DOCUMENTS 3,392,106 A * 7/1968 Burgess .................. C07C 5/321
502/79
3,425,810 A * 2/1969 Scott, Jr. ................ B01J 8/0453
422/607

(Continued)

FOREIGN PATENT DOCUMENTS

WO 2019022907 A1 1/2019

*Primary Examiner* — Michelle Stein
(74) *Attorney, Agent, or Firm* — C. Tumey Law Group PLLC (57) ABSTRACT

A hydrocarbon feed stream, particularly one comprising heavier hydrocarbons, may be converted to valuable products such as motor gasoline and/or lubricating oil by employing one or more large pore zeolitic catalysts, which may be prepared from a precursor zeolite. In some examples, a large pore zeolitic catalyst may be utilized to selectively reduce the endpoint of a hydrocarbon composition.

25 Claims, 5 Drawing Sheets

(51) Int. Cl.
  *B01J 29/74*    (2006.01)
  *B01J 35/64*    (2024.01)
  *C10G 47/18*    (2006.01)

(52) U.S. Cl.
  CPC ................ *C10G 2300/1037* (2013.01); *C10G 2300/301* (2013.01)

(58) Field of Classification Search
  CPC .. C10G 65/10; C10G 65/12; B01J 8/08; B01J 29/74; B01J 35/1057; B01J 29/126; B01J 35/1023; B01J 2229/20; B01J 2229/42
  See application file for complete search history.

(56) References Cited

U.S. PATENT DOCUMENTS

| | | | | |
|---|---|---|---|---|
| 3,758,402 A * | 9/1973 | Olek | ............... | C10G 47/16 502/67 |
| 4,120,778 A * | 10/1978 | Goudriaan | ............. | C10G 65/14 208/86 |
| 4,443,326 A * | 4/1984 | Field | ................... | C10G 35/095 585/419 |
| 4,820,402 A * | 4/1989 | Partridge | .............. | C07C 255/00 502/79 |
| 4,943,366 A * | 7/1990 | Fischer | ................. | C10G 69/02 208/68 |
| 4,954,241 A * | 9/1990 | Kukes | .................... | C10G 65/10 208/89 |
| 5,198,099 A * | 3/1993 | Trachte | ................. | C10G 65/12 208/89 |
| 6,709,571 B1 * | 3/2004 | Del Rossi | ............. | C10G 47/16 208/254 R |
| 2014/0336394 A1 * | 11/2014 | Burton | ................ | B01J 29/7007 423/718 |
| 2016/0039779 A1 * | 2/2016 | Burton | .................. | B01J 35/002 548/524 |
| 2018/0291287 A1 * | 10/2018 | Brown | ................ | C10G 21/003 |

* cited by examiner

LARGE PORE ZEOLITIC CATALYSTS AND USE THEREOF IN CATALYTIC CRACKING

CROSS-REFERENCE TO RELATED APPLICATIONS

This application is the 35 USC § 371 National State Application for PCT Application Number PCT/US2020/041867, filed on Jul. 14, 2020, which claims the benefit of U.S. Provisional Application No. 62/889,126, filed on Aug. 20, 2019, the entire contents of both of which are incorporated herein by reference.

BACKGROUND OF THE INVENTION

This application relates to methods and systems for the conversion of hydrocarbon feedstocks, in particular, heavier vacuum gasoil (VGO) distillate-range hydrocarbons, into fuel distillate-range hydrocarbon product streams, the product streams being characterized by a $T_{95}$ distillation temperature that is lower than the $T_{95}$ distillation temperature of the hydrocarbon feed stream, the methods and systems involving the use of large pore zeolitic catalysts comprising large pore zeolites.

Catalytic cracking (e.g., hydrocracking, fluid catalytic cracking) has been an important process for decades, enabling conversion of low value, heavy hydrocarbons derived from crude oil into valuable products such as gasoline, diesel fuel, and lubricants. Catalytic cracking utilizes a catalyst to facilitate hydrocarbon cracking. A cracking catalyst typically includes a metal function and an acid function.

Hydrocracking, which is performed in the presence of hydrogen, has recently become a subject of considerable interest in the petroleum industry because of advantages that it offers over conventional catalytic cracking operations. Chemically, hydrocracking may be considered a combination of hydrogenation and catalytic cracking where high-boiling hydrocarbons are to lower boiling fractions and olefinic and aromatic hydrocarbons are hydrogenated to generate paraffins and naphthenes.

Hydrocracking typically employs catalysts comprising zeolites, which are materials based on silica ($SiO_4^{4-}$) and alumina ($AlO_4^{5-}$) in combination with countercations, such as sodium, potassium, calcium, magnesium, and the like. Much of the catalysis of the necessary reactions occurs within the zeolite's pores. Most zeolites used in hydrocracking have pores defined by rings of eight, ten, or twelve tetrahedral atoms and are generally considered to be no larger than about 1 nm. The selectivity and activity of a zeolitic catalyst are highly dependent on the mass diffusion of the hydrocarbons from the hydrocarbon feed stream into and out of the pores of the zeolite. Thus, larger molecules are difficult to convert, as their size excludes them from entering the pore. Consequently, zeolitic catalysts are perhaps best suited for converting feedstocks that include smaller hydrocarbons that easily diffuse in and out of the pores of the zeolite.

Amorphous silica-alumina (Si/Al) is also a commonly used hydrocracking catalyst and has pores with dimensions in excess of 10 nm, allowing access for large molecules; however, Si/Al catalysts exhibit lower catalytic activity than zeolites and therefore, are not preferred in hydrocracking processes.

What is needed is a hydrocracking catalyst that has high activity like a zeolite, but large pores such that larger hydrocarbons may be effectively converted into valuable products.

SUMMARY OF THE INVENTION

This application relates to methods and systems for the conversion of hydrocarbon feedstocks, in particular, heavier vacuum gasoil (VGO) distillate-range hydrocarbons, into fuel distillate-range hydrocarbon product streams, the product streams being characterized by a $T_{95}$ distillation temperature that is lower than the $T_{95}$ distillation temperature of the hydrocarbon feed stream, the methods and systems involving the use of large pore zeolitic catalysts comprising large pore zeolites.

Provided herein is a method for converting hydrocarbons. One method for converting hydrocarbons includes providing a large pore zeolitic catalyst comprising a large pore zeolite and contacting a hydrocarbon feed stream with the large pore zeolitic catalyst under conditions effective to convert the hydrocarbon feed stream to a hydrocarbon product stream characterized by a $T_{95}$ distillation temperature that is lower than the $T_{95}$ distillation temperature of the hydrocarbon feed stream.

Provided herein is a system for converting hydrocarbons comprising at least one reactor, the reactor comprising: a hydrocarbon feed stream inlet arranged and configured to convey a hydrocarbon feed stream into the reactor; a hydrocarbon product stream outlet arranged and configured to convey a hydrocarbon product stream out of the reactor; and at least one catalyst bed comprising at least one large pore zeolitic catalyst, wherein the large pore zeolitic catalyst contains a large pore zeolite.

BRIEF DESCRIPTION OF THE DRAWINGS

The following figures are included to illustrate certain aspects of the disclosure, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

This application relates to methods and systems for the conversion of hydrocarbon feedstocks, in particular, heavier vacuum gasoil (VGO) distillate-range hydrocarbons, into fuel distillate-range hydrocarbon product streams, the product streams being characterized by a $T_{95}$ distillation temperature that is lower than the $T_{95}$ distillation temperature of the hydrocarbon feed stream, the methods and systems involving the use of large pore zeolitic catalysts comprising large pore zeolites.

Discovery of catalysts that exhibit measurable hydrocracking activity and stability is surprising and unexpected, given the scarcity of zeolites having pores defined by rings having more than twelve atoms. Methods and systems for using these catalysts to convert hydrocarbon feed streams to hydrocarbon product streams being characterized by a $T_{95}$ distillation temperature that is lower than the $T_{95}$ distillation temperature of the hydrocarbon feed stream are disclosed below.

To facilitate an understanding of the present invention, a number of terms and phrases are defined below.

As used in the present disclosure and claims, the singular forms "a," "an," and "the" include plural forms unless the context clearly dictates otherwise.

The term "and/or" as used in a phrase such as "A and/or B" herein is intended to include "A and B", "A or B," "A," and "B."

As used herein, "hydroprocessing" and any grammatical variations thereof, refers to a process utilizing hydrogen to treat a hydrocarbon feedstock. This includes, but is not limited to, hydrotreating, hydrocracking, catalytic dewaxing, and hydrofinishing/aromatic saturation.

As used herein, "hydrotreating" and grammatical variations thereof, refers to a process that removes contaminants such as nitrogen, sulfur, oxygen, other heteroatoms, metals, and aromatics, from hydrocarbon feedstock by treating with hydrogen. Hydrotreating may also convert olefins and aromatics to saturated compounds. Examples of hydrotreating include, but are not limited to, hydrogenolysis (e.g., hydrodesulfurization, hydrodenitrogenation, hydrodeoxygenation, hydrodemetallization, hydrodeasphalteneization) and hydrogenation (e.g., olefin saturation, aromatic saturation (hydrodearomatization).

As used herein, "hydrocracking" and grammatical variations thereof, refers to a process of converting a higher boiling range hydrocarbon feedstock to a lower boiling range hydrocarbon feedstock in the presence of hydrogen. The reactions that may occur include breaking bonds in larger molecules to produce smaller molecules as well as rearrangement of the atoms in the molecules themselves.

A hydrocarbon composition (e.g., a hydrocarbon feedstock) will have a characteristic distillation profile defined by the percent (or fraction) of the composition that boils at or below a particular temperature. For example, a $T_5$ distillation temperature refers to the temperature at which 5% of the hydrocarbon composition boils. Similarly, a $T_{95}$ distillation temperature refers to the temperature at which 95% of the hydrocarbon composition boils. Distillation profiles for a feed can be determined according to ASTM D2887-18.

As used herein, a particular fraction of a feedstock may be referred to by its $T_5$-$T_{95}$ range, either as an explicit range or as an upper or lower limit. For example, a 650° F. (343° C.) to 720° F. (382° C.) fraction may be characterized by a $T_5$-$T_{95}$ range of 650° F. (343° C.) to 720° F. (382° C.). In another example, a 720° F.− (382° C.−) fraction is defined by hydrocarbons having a $T_{95}$ temperature of 720° F. (382° C.). Similarly, a 650° F.+ (343° C.+) fraction is defined by hydrocarbons having a $T_5$ temperature above 650° F. (343° C.).

As used herein, a particular fraction of a feedstock may be referred to by the number of carbon atoms in the molecules making up the fraction. The number of carbon atoms may be described either by an explicit range or as an upper or lower limit. For example, a $C_{4-}$ fraction contains hydrocarbons having four or fewer carbon atoms. In another example, a $C_{5+}$ fraction contains hydrocarbons having five or more carbon atoms. A $C_2$-$C_4$ fraction contains hydrocarbons having two, three, or four carbon atoms.

As used herein, "fraction" refers to a portion of a hydrocarbon composition that is identifiable by a particular property, such as boiling range, number of carbon atoms, and/or molecular weight range. A fraction may have been separated from the hydrocarbon composition or it may still be a part of the hydrocarbon composition.

As used herein, "catalytic cracking" and grammatical variations thereof, refers to a process of converting a higher boiling range hydrocarbon feedstock to a lower boiling range hydrocarbon feedstock in the presence of a catalyst that facilitates the conversion. Conversion of a particular composition may be measured quantitatively based on boiling range. Conversion of a composition or a fraction to a product stream may be quantified by subtracting the weight percent of a fraction in the product that boils above a certain temperature from the weight percent of the fraction in the feed boiling above that same certain temperature and dividing that difference by the weight percent of the fraction in the feed that boils above that same certain temperature.

As used herein, liquid petroleum gas (LPG) refers to a hydrocarbon composition the majority of which is propane and butane (including n-butane and isobutane).

As used herein, "vacuum gasoil," "VGO," "vacuum gasoil-range," and grammatical variations thereof, refer to a hydrocarbon composition characterized by a $T_5$ of about 644° F. (340° C.) to about 662° F. (350° C.) and a $T_{95}$ range of about 1030° F. (555° C.) to about 1058° F. (570° C.).

As used herein, "distillate fuel," "distillate fuel boiling range," "distillate fuel fraction," and grammatical variations thereof refer to a hydrocarbon composition characterized by a $T_5$-$T_{95}$ of about 400° F. (204° C.) to about 650° F. (343° C.) or 680° F. (360° C.).

As used herein, "large pore zeolitic catalyst" refers to a catalyst derived from a zeolite having pores (i) greater than about 8 Å in at least one dimension and (ii) defined by rings greater than twelve tetrahedral atoms.

As used herein, "zeolite" or "zeolitic" is defined to refer to a crystalline material having a porous framework structure built from tetrahedral atoms connected by bridging oxygen atoms. Examples of known zeolite frameworks are given in the "Atlas of Zeolite Frameworks" published on behalf of the Structure Commission of the International Zeolite Association", 6th revised edition, Ch. Baerlocher, L. B. McCusker, D. H. Olson, eds., Elsevier, N.Y. (2007) and the corresponding website, http://www.iza-structure.org/databases, each which is incorporated by reference herein with respect to its disclosure of zeolitic frameworks and methods for their preparation. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, antimony, tin, and/or other transition metals that can substitute for silicon and/or aluminum in a zeolitic framework. Large pore zeolites useful in the preparation of large pore zeolitic catalysts may be prepared from a zeolite precursor, retaining the properties described above with regards to a zeolite. Large pore zeolites, as described herein, may be referred to by the number of tetrahedral atoms (exclusive of oxygen atoms) that define pore openings in the zeolite. For example, a large pore zeolite may be defined by 21 tetrahedral atoms. A large pore zeolitic catalyst derived from a zeolite precursor having pores (i) greater than about 8 Å in at least one dimension and (ii) defined by rings greater than twelve tetrahedral atoms will be referred to herein as a "large pore zeolitic catalyst."

As used herein, "isostructural" is given its common meaning in the art and refers to crystals having the same structure, but not necessarily the same chemical composition or cell dimensions. As used herein, "isomorphous" is given its common meaning in the art and refers to isostructural crystals having the same cell dimensions (and therefore generates the same PXRD pattern).

As used herein, "conditions effective to" refers to conditions to which a hydrocarbon feed stream is subjected such that the hydrocarbon feed stream is sufficiently converted into a hydrocarbon product stream. Conditions may include temperature, pressure, reaction time, and the like, which are conditions known to those of ordinary skill in the art with benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

To facilitate a better understanding of the embodiments of the present invention, the following examples of preferred or representative embodiments are given. In no way should the following examples be read to limit, or to define, the scope of the invention.

More illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods may also "consist essentially of" or "consist of" the various components and steps.

Disclosed herein are methods and systems for converting hydrocarbons. Suitable methods include a method comprising: providing a large pore zeolitic catalyst comprising a large pore zeolite; and contacting a hydrocarbon feed stream with the large pore zeolitic catalyst under conditions effective to convert the hydrocarbon feed stream to a hydrocarbon product stream, the product stream being characterized by a $T_{95}$ distillation temperature that is lower than the $T_{95}$ distillation temperature of the hydrocarbon feed stream.

Hydrocarbon Feed Streams

The methods and system described herein may be suitable for converting a hydrocarbon feed stream comprising hydrocarbons having a $T_5$ value at or above about 392° F. (200° C.). Suitable hydrocarbon feed streams include those derived from, but not limited to, straight run (atmospheric) gas oils, demetallized oils, coker distillates, cat cracker distillates, heavy naphtha, bio-diesel, Fischer-Tropsch wax, and any blend thereof.

A hydrocarbon feed stream suitable for conversion with a large pore zeolitic catalyst may have no detectable nitrogen content to about 50 wppm (50 mg/L) nitrogen, but preferably has a nitrogen content less than about 5 wppm (5 mg/L). A hydrocarbon feed stream suitable for conversion with a large pore zeolitic catalyst may have no detectable sulfur content to about 50 wppm (50 mg/L) sulfur, but preferably has a sulfur content of less than about 10 wppm (10 mg/L). A hydrocarbon feed stream having a higher sulfur and/or nitrogen content may be pre-treated, as described above, in a pre-treatment stage to reduce the sulfur and/or nitrogen content prior to contacting the hydrocarbon feed stream with one or more large pore zeolitic catalysts.

Intermediate Hydrocarbon Streams

In any configuration, a hydrocracking unit may include a first reactor comprising a conventional hydrocracking catalyst (e.g., USY zeolite or Pt on Si/Al) and a second reactor comprising a large pore zeolitic catalyst. In such configurations, a first reactor may be held at conditions effective to convert a hydrocarbon product stream to an intermediate hydrocarbon stream while minimizing the formation of a $C_4$-fraction. The intermediate hydrocarbon stream thus may include a residual fraction that boils above 650° F. (343° C.), which is typically considered too high for conversion into valuable fuels. The intermediate hydrocarbon stream may then be conveyed to a second reactor comprising a large pore zeolitic catalyst, which may selectively convert larger hydrocarbons in the intermediate hydrocarbon stream, effectively generating a hydrocarbon product stream with a lower $T_{95}$ distillation temperature (or final boiling point) than the hydrocarbon feed stream while minimizing the formation of a $C_{4-}$ fraction.

Reactor Conditions

Using the systems and methods described herein, a hydrocarbon feed stream may be contacted with a large pore zeolitic catalyst under conditions effective to generate a hydrocarbon product stream. The contacting of the hydrocarbon feed stream takes place in a reactor, for example, in a catalyst bed. The catalyst bed may be a fixed bed or a moving bed. The conditions may additionally include providing hydrogen to the reactor. Suitable reactor temperatures include 200° C. to 450° C., which includes, for example, 315° C. to 425° C. Suitable reactor pressures include 250 psig (about 1720 kPa) to 5000 psig (about 34470 kPa), which includes 500 psig (about 3450 kPa) to 3000 psig (about 20680 kPa) and 800 psig (about 5516 kPa) to 2500 psig (about 17240 kPa). Suitable LHSVs include 0.1 hour$^{-1}$ to 10 hour$^{-1}$. Suitable hydrogen treat rates include 200 scf/B (35.6 m$^3$/m$^3$) to 10,000 scf/B (1781.08 m$^3$/m$^3$) which includes 500 (89.1 m$^3$/m$^3$) to 10,000 scf/B (1781.08 m$^3$/m$^3$).

Hydrocarbon Product Streams

The methods and system described herein may be suitable for converting a hydrocarbon feed stream to a hydrocarbon product stream comprising hydrocarbons having a $T_{95}$ distillation temperature that is lower than the $T_{95}$ distillation temperature of the hydrocarbon feed stream. Ideally, a hydrocarbon product stream contains distillate fuel-range hydrocarbons and/or lubricating oil-range hydrocarbons and contains a minimal amount of lighter hydrocarbons (e.g., $C_{4-}$ hydrocarbons). For example, a hydrocarbon product stream may contain from about 50 wt. % to about 100 wt. %, from about 60 wt. % to about 100 wt. %, from about 70 wt. % to about 100 wt. %, from about 80 wt. % to about 100 wt. %, or from about 90 wt. % to about 100 wt. % distillate-fuel range hydrocarbons, lubricating oil-range hydrocarbons, or a combination thereof. A hydrocarbon product stream may be a result of, for example, cracking of paraffins into smaller hydrocarbons, ring opening of naphthenes into paraffins, hydrogenation and subsequent ring opening of aromatics, hydrogenation of isoparaffins, or a combination thereof. A hydrocarbon product stream may contain LPG, light naphtha, jet fuel, diesel boiling range distillate fraction, jet fuel boiling range distillate fraction, kerosene boiling range distillate fractions, or any blend thereof.

Systems and Methods for Converting a Hydrocarbon Feed Stream

The large pore zeolitic catalysts disclosed herein may be suitable for converting a hydrocarbon feed stream. A hydrocarbon feed stream may be contacted with one or more large pore zeolitic catalysts under conditions effective to convert the hydrocarbon feed stream to a hydrocarbon product stream having a lower $T_{95}$ than the hydrocarbon feed stream. A large pore zeolitic catalyst may have a pore opening and/or volume larger than, for example, a zeolite having pores defined by rings of eight, ten, or twelve tetrahedral atoms (e.g., larger than about 1 nm). The conditions effective may include providing hydrogen to one or more reaction zones.

A system for performing the methods disclosed herein is also provided. A system may include, but is not limited to, a hydrocarbon feed stream, a hydrocarbon product stream, and at least one reactor in which the hydrocarbon feed stream may be contacted with at least one large pore zeolitic catalyst, as described herein, under conditions effective to convert the hydrocarbon feed stream to the hydrocarbon product stream. The reactor includes at least one catalyst bed comprising a large pore zeolitic catalyst. The catalyst may be a large pore zeolitic catalyst. The at least one reactor has a hydrocarbon feed inlet constructed and arranged to receive the hydrocarbon feed stream and a hydrocarbon product outlet constructed and arranged to provide the hydrocarbon product stream. The at least one reactor may also include an inlet for providing hydrogen to the reactor. A system for converting a hydrocarbon feed stream may be part of a hydrocracking unit. The system may optionally include a pre-treatment stage upstream of the at least one reactor and/or a post-treatment stage downstream of the at least one reactor. A pre-treatment stage may be present to modify the disposition of a hydrocarbon feed stream for compatibility with downstream processes, for example, to remove sulfur, water, nitrogen, and/or the like. For example, a hydrocarbon feed stream may be treated to adjust sulfur to a level lower than about 500 wppm (50 mg/L) and/or nitrogen to a level lower than about 100 wppm (100 mg/L).

A post-treatment stage may be present to modify the disposition of a hydrocarbon product stream for conversion into a commercial product or for compatibility with a subsequent process, for example, naphtha reforming. A post-treatment stage may, for example, include catalytic or solvent de-waxing, sweet-stage hydrofinishing, distillation, and/or the like.

A reactor may include one or more catalyst beds. For example, two or more catalyst beds may be arranged in a stacked configuration. The one or more catalyst beds may be fixed or moving catalyst beds. At least one of the one or more catalyst beds contains a large pore zeolitic catalyst. By way of a non-limiting example, a first catalyst bed in a stacked configuration may contain one or more conventional hydrocracking catalysts (e.g., USY zeolite, Pt on Si/Al). A second catalyst bed in a stacked configuration may contain a large pore zeolitic catalyst as disclosed herein. This example configuration may be particularly useful, for example, to catalytically crack a hydrocarbon composition with a conventional hydrocracking catalyst then contact the cracked hydrocarbon composition with a large pore zeolitic catalyst to selectively reduce the endpoint of the cracked hydrocarbon composition. Optionally a third catalyst bed may contain a post-treatment catalyst, for example, a dewaxing catalyst.

Example Systems

Figure 1:
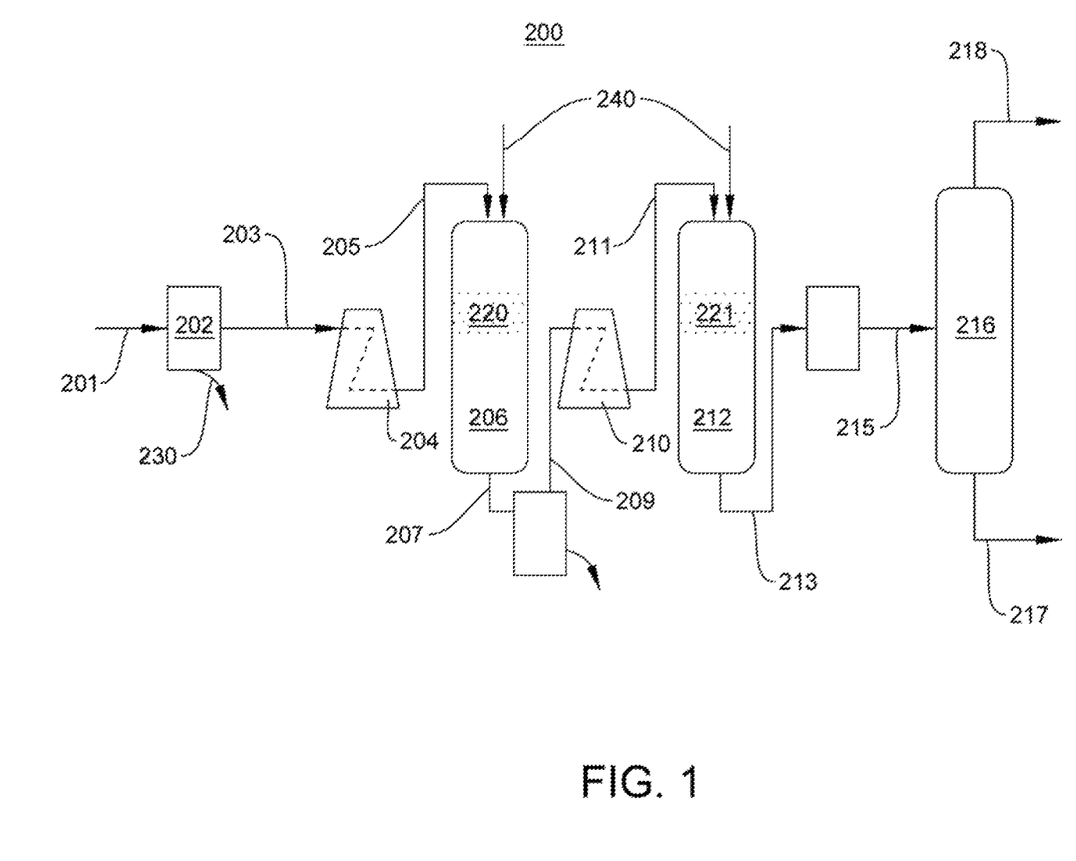
FIG. 1 shows an example of a system suitable for converting a hydrocarbon feedstock as described herein.

FIG. 1 depicts a sample configuration of a system for converting hydrocarbons using at least one large pore zeolitic catalyst as disclosed herein. The hydrocracking unit 200 in FIG. 1 includes a pre-treatment stage 202, a first heater 204, a first reactor 206, a first separation stage 208, a second heater 210, a second reactor 212, a post-treatment stage 214, and a final separation stage 216. A hydrocarbon feed stream 201 may be conveyed into a pre-treatment stage 202. Any waste, for example, water, hydrogen sulfide, ammonia, may be separated and discarded as a waste stream 230. Optionally, but not shown, a naphtha stream may be isolated as well. The pre-treated hydrocarbon feed stream 203 may be conveyed to the first heater 204 to warm the pre-treated hydrocarbon feed stream 203 and generating a warmed hydrocarbon feed stream 205. The warmed hydrocarbon feed stream 205 may then be conveyed through the first reactor 206 comprising a catalyst bed 220, generating an intermediate hydrocarbon stream 207. The intermediate hydrocarbon stream 207 may be conveyed through the first separation stage 208 where any undesirable fraction generated from reactions occurring in the first reactor 06 may be isolated and discarded as waste 231. For example, a $C_{4-}$ fraction may be discarded. The resulting cleaned intermediate hydrocarbon stream 209 may then be conveyed through the second heater 210 generating a warmed intermediate hydrocarbon stream 211. The warmed intermediate hydrocarbon stream 211 may then be conveyed to the second reactor 212 comprising a catalyst bed 221, generating a hydrocarbon product stream 213. The hydrocarbon product stream 213 may be conveyed to the post-treatment stage 214 generating a treated hydrocarbon product stream 215, which may then be conveyed to the final separation stage 216 to separate the treated hydrocarbon product stream 215 into two or more fractions 217, 218, which may include, but are not limited to, a lubricant fraction, a distillate fuel fraction, LPG, naphtha, a $C_{4-}$ fraction, a $C_{5+}$ fraction, and any blend thereof. A hydrogen-containing stream 240 may be conveyed into each of the reactors 206, 212. At least one of the catalyst beds 220, 221 contains at least one large pore zeolitic catalyst as described herein. For example, the catalyst bed 221 in the second reactor 212 may contain a large pore zeolitic catalyst.

The pre-treatment stage may include any apparatus necessary for modifying the disposition of a hydrocarbon feed stream. For example, the pre-treatment stage may include a sorbent, a hydrotreating reactor, an aromatic saturation catalyst, or any combination thereof.

The configuration shown in FIG. 1 depicts two reactors 206, 212, however, it is understood that a system for converting hydrocarbons may include any number of reactors. In any embodiment, any of the pre-treatment stage 202, the first heater 204, the first reactor 206, and first separation stage 208 are optional. In instances where any or multiple of these components are absent, the component directly upstream of the absent component/s is directly connected to the component directly downstream of the absent component/s.

A system for converting a hydrocarbon feed stream may additionally include apparatuses for controlling the various components of the system. For example, temperature/s pressure/s, liquid hourly space velocity (LHSV), weight hourly space velocity (WHSV), and/or the hydrogen treat rate may each be adjusted. Examples of system components that may be controlled include, but are not limited to, valves, heat exchangers, heaters, flow meters, and reactors. A system may optionally include one or more feedback loops comprising one or more processors and detectors.

Large Pore Zeolitic Catalysts & Example Methods of their Preparation

The large pore zeolitic catalysts disclosed herein may be characterized by powder X-ray diffraction (PXRD), as will be described in detail below. PXRD analyses are collected with a Bruker D8 Endeavor diffraction system with a LYNXEYE detector, using copper K-alpha radiation. The diffraction data is recorded by step scanning at 0.02 degrees two-theta, where theta is the Bragg angle and uses an effective counting time of 2 seconds for each step.

The large pore zeolitic catalysts disclosed herein may have enhanced acidity, which may be measured, for example, by its Alpha value. Alpha value is an approximate indication of the catalytic cracking activity of a catalyst of interest (e.g., a large pore zeolitic catalyst) compared to a standard catalyst and gives the relative rate constant (rate of normal hexane conversion per volume of catalyst per unit time). It is based on the activity of silica-alumina cracking catalyst having an alpha value of 1 (Rate Constant=0.016 $s^{-1}$). The alpha test is described in U.S. Pat. No. 3,354,078; in the Journal of Catalysis, 4, 527 (1965); 6, 278 (1966); and 61, 395 (1980), each incorporated herein by reference with respect to its disclosure of how to carry out the Alpha test. The experimental conditions of the test used herein include a constant temperature of 1000° F. (537.8° C.) and a variable flow rate as described in detail in the Journal of Catalysis, 61, 395.

The pore volume of a large pore zeolite or a large pore zeolitic catalyst may be determined by the t-plot method, which is well known and understood in the art.

The large pore zeolitic catalysts described herein include a large pore zeolite. One example of a large pore zeolitic catalyst, denoted "EMM-23," contains a large pore zeolite characterized by trilobe-shaped pores bound by 21-24 tetrahedral atoms. Post-synthetic cation exchange reveals that EMM-23 may be tuned for selective conversion of a 650° F.+/680° F.+ (343° F.+/360° F.+) fraction of a 930° F.– (500° C.–) feedstock.

Large pore zeolitic catalysts suitable for use in the methods and systems described herein are prepared from a precursor material, which is a large pore zeolite ("precursor zeolite"). A large pore zeolite suitable for generating a large pore zeolitic catalyst may be prepared by any method known for making zeolites. For example, a large pore zeolite may be prepared from a synthesis mixture comprising a water source, hydroxyl ions, an oxide of a tetravalent element Y, optionally a trivalent element X, optionally a source of fluoride (F) ions, and a structure-directing agent (Q). A synthesis mixture may have a composition, in terms of mole ratios of oxides, within the ranges specified in Table 1 below.

TABLE 1

| Reactants | Useful | Preferred |
|---|---|---|
| $YO_2/X_2O_3$ | At least 10 | At least 100 |
| $H_2O/YO_2$ | 0.5-30 | 2-10 |
| $OH^-/YO_2$ | 0.1-1.0 | 0.2-0.5 |
| $F/YO_2$ | 0-0.25 | 0 |
| $Q/YO_2$ | 0.05-0.5 | 0.1-0.25 |

When Y is desired to be silicon and/or germanium, suitable sources of Y include, but are not limited to, colloidal suspensions of silica, precipitated silica, fumed silica, alkali metal silicates, tetraalkyl orthosilicates, and germanium oxide. If present, the trivalent element X may be, but is not limited to, aluminum. Examples of suitable sources of aluminum include, but are not limited to, hydrated alumina, aluminum hydroxide, alkali metal aluminates, aluminum alkoxides, and water-soluble aluminum salts, such as aluminum nitrate.

If present, examples of suitable sources of fluoride ions include, but are not limited to, one or more of $F_2$ (gas), HF, $NH_4F$, and $NH_4HF_2$. Suitable structure-directing agents (Q) include, but are not limited to, 1,5-bis(N-propylpyrrolidinium)pentane dications and/or 1,6-bis(N-propylpyrrolidinium)hexane dications. Structure-directing agents may be provided in the hydroxide and/or salt form of the relevant diquaternary ammonium compound, which may readily be synthesized by a reaction of N-propylpyrrolidine with 1,5-dibromopentane or 1,6-dibromohexane. All reagents may be mixed together by a mechanical process such as stirring or high shear blending to assure suitable homogenization of the synthesis mixture. Depending on the nature of the reagents, it may be necessary to reduce the amount of water in the mixture before crystallization to obtain the preferred $H_2O/YO_2$ molar ratio. Suitable methods for reducing the water content include evaporation under a static or flowing atmosphere such as ambient air, dry nitrogen, dry air, or by spray drying or freeze-drying. Crystallization may be carried out at either static or stirred conditions in a suitable reactor vessel (e.g., polypropylene jar, Teflon-lined or stainless steel autoclaves), at a temperature of about 100° C. to about 200° C. for a time sufficient for crystallization to occur at the temperature used (e.g., from about one day to about fourteen days). Thereafter, the crystals may be separated from the liquid and recovered. Structure-directing and fluorinating components, which are associated with the large pore zeolite because of their presence during crystallization, are easily removed by conventional post-crystallization methods. For example, all of the organic directing agent Q may be removed by thermal treatment by heating at a temperature of at least about 370° C. for at least about one minute but generally less than about twenty hours. The thermal treatment may be performed at a temperature up to about 925° C. The thermally treated product, especially in its metal, hydrogen and ammonium forms, may be suitable for use in the catalysis of certain organic (e.g., hydrocarbon) conversion reactions.

Another example of a suitable large pore zeolite for generating a large pore zeolitic catalyst is, as denoted herein, EMM-23. EMM-23 may be characterized by the empirical chemical formula $(X_2O_3)_m(YO_2)_n$, where n and m are independently 0 or a positive number. For example, n and m may be (independently) 0, between about 1 and about 10, between about 1 and about 20, between about 1 and about 30, between about 1 and about 40, between about 1 and about 50, between about 1 and about 60, between about 10 and about 20, between about 10 and about 30, between about 10 and about 40, between about 10 and about 50, between about 10 and about 60, between about 20 and about 30, between about 20 and about 40, between about 20 and about 50, between about 20 and about 60, between about 30 and about 40, between about 30 and about 50, between about 30 and about 60, or greater than about 60. X is a trivalent element (e.g., B, Al, Fe, Ga), and Y is a tetravalent element (e.g., Si, Ge, Sn, Ti, and Zr). EMM-23 has a trilobed-shaped pore structure bound by 21-24 tetrahedral atoms. These trilobe-shaped pores of EMM-23 are intersected perpendicularly by a two-dimensional 10-atom ring channel system and have a high density of $Q^2$ and $Q^3$ silicon species. EMM-23 as well as its preparation is disclosed, for example, in Willhammer, et al.; EMM-23: a stable high silica multi-dimensional zeolite with extra-large trilobe-shaped channels; J. Am. Chem. Soc., 2014, 136, 39, 13570-13573, in U.S. Pat. No. 9,205,416, and in U.S. Pat. No. 9,682,945 each of which are incorporated herein by reference with respect to their disclosure of EMM-23 properties, structure, and synthesis.

EMM-23 may be characterized by a BET surface area ranging from about 700 m$^2$/g to about 950 m$^2$/g and a particularly high micropore volume. For example, in samples of EMM-23, the micropore volume as determined by nitrogen physisorption, was found to be 0.28 cc/g. EMM-23 may be characterized by the PXRD pattern having the peaks in Table 2 below.

TABLE 2

| Interplanar d-spacing (Å ± 0.2 Å) | Relative intensity [100 × I/I$_o$] |
|---|---|
| 17.5-16.3 | 60-100 |
| 10.6-10.1 | 5-50 |
| 9.99-9.56 | 20-70 |
| 6.23-6.06 | 1-10 |
| 5.84-5.69 | 1-10 |
| 5.54-5.40 | 1-10 |
| 4.29-4.21 | 1-10 |
| 3.932-3.864 | 1-10 |
| 3.766-3.704 | 5-40 |
| 3.735-3.674 | 1-10 |
| 3.657-3.598 | 1-10 |
| 3.595-3.539 | 1-20 |

In one variation of EMM-23, denoted herein as Si-EMM-23 ("siliceous EMM-23"), the as-synthesized EMM-23 catalyst may be characterized by a substantial absence of alumina, having an empirical structure of SiO$_2$ ((X$_2$O$_3$)$_m$(YO$_2$)$_n$, where m is substantially zero, Y=Si, and n is at least 1). Si-EMM-23 may be prepared by the methods described above.

In another variation of EMM-23, denoted herein as Al-EMM-23, the empirical chemical formula is: (Al$_2$O$_3$)$_{27}$SiO$_2$. Al-EMM-23 may be prepared by first generating Si-EMM-23 and impregnating the zeolitic structure with aluminum, as described above.

A large pore zeolite may be treated with one or more cation sources under conditions effective to incorporate the cation/s into the zeolitic structure of the large pore zeolite. For example, a cation source may contain one or more metals. A large pore zeolite may contain at least about 0.01 wt. %, at least about 0.05 wt. %, at least about 0.25 wt. %, at least about 1 wt. %, at least about 2.5 wt. %, at least about 5 wt. %, at least about 10 wt. %, or in a range from about 0.01 wt. % to about 10 wt. %, about 0.01 wt. % to about 5.0 wt. %, about 0.01 wt. % to 2.5 wt. %, about 0.01 wt. % to about 1 wt. %, about 0.01 wt. % to about 0.25 wt. %, about 0.01 wt. % to about 0.05 wt. %, about 0.05 wt. % to about 10 wt. %, about 0.05 wt. % to about 5.0 wt. %, about 0.05 wt. % to about 2.5 wt. %, about 0.05 wt. % to about 1 wt. %, about 0.05 wt. % to about 0.25 wt. %, about 0.25 wt. % to 10 wt. %, about 0.25 wt. % to about 5 wt. %, about 0.25 wt. % to about 1 wt. %, about 1 wt. % to about 10 wt. %, about 1 wt. % to about 5 wt. %, about 1 wt. % to about 2.5 wt. %, about 2.5 wt. % to about 10 wt. %, about 2.5 wt. % to about 5 wt. %, or about 5 wt. % to about 10 wt. % metal, based on the final weight of the large pore zeolitic catalyst. Suitable metals include transition metals, for example, molybdenum (Mo), tungsten (W), rhenium (Re), ruthenium (Ru), iridium (Ir), indium (In), rhodium (Rh), cobalt (Co), chromium (Cr), manganese (Mn), nickel (Ni), palladium (Pd), platinum (Pt), or any combination thereof (e.g., Pt/Pd, Pt/Rh, Pd/Rh). Other examples of suitable metals include Group 12, Group 13, Group 14, or Group 15 metals, for example, aluminum. A metal may be a rare earth metal, for example, any lanthanide, scandium (Sc), yttrium (Y), or any combination thereof. In another example, a cation may be a hydrogen ion or a hydrogen precursor (e.g., ammonium ion). Incorporation of one or more cations into the large pore zeolite may be carried out by any method known in the art, for example, by ion exchange, impregnation, Muller addition, co-crystallization, or the like. For example, platinum may be incorporated by treating a large pore zeolite with a solution containing platinum-containing ions such as, but not limited to, platinum(II) acetylacetonate, platinum nitrate, platinum(II) chloride, platinum(IV) chloride, platinum(II) bromide, platinum(IV) bromide, platinum(II) iodide, platinum(IV) iodide, platinum(IV) oxide, chloroplatinic acid, tetraamineplatinum(II) chloride, tetraamineplatinum(II) hydroxide, tetraamineplatinum(II) nitrate, and trimethyl(methylcyclopentadienyl)platinum(IV).

A large pore zeolitic catalyst may be prepared from a large pore zeolite, for example, by extruding a large pore zeolite with a binder. Examples of suitable binders include other zeolites, other inorganic materials such as clays and metal oxides such as alumina, silica, silica-alumina, titania, zirconia, Group 1 metal oxides, Group 2 metal oxides, and combinations thereof. Clays may be kaolin, bentonite, and montmorillonite and are commercially available. They may be blended with other materials such as silicates. Other suitable binders may include binary porous matrix materials (such as silica-magnesia, silica-thoria, silica-zirconia, silica-beryllia and silica-titania), and ternary materials (such as silica-alumina-magnesia, silica-alumina-thoria and silica-alumina-zirconia). While described above as occurring prior to extrusion, optionally, one or more cations, as described above, may be incorporated into a large pore zeolitic catalyst after a large pore zeolite is extruded with a binder.

A large pore zeolitic catalyst may include from about 1 wt. % to about 10 wt. %, about 1 wt. % to about 20 wt. %, about 1 wt. % to about 30 wt. %, about 1 wt. % to about 40 wt. %, about 1 wt. % to about 50 wt. %, about 1 wt. % to about 60 wt. %, about 1 wt. % to about 70 wt. %, about 1 wt. % to about 80 wt. %, about 1 wt. % to about 90 wt. %, about 1 wt. % to about 99 wt. %, about 10 wt. % to about 20 wt. %, about 10 wt. % to about 30 wt. %, about 10 wt. % to about 40 wt. %, about 10 wt. % to about 50 wt. %, about 10 wt. % to about 60 wt. %, about 10 wt. % to about 70 wt. %, about 10 wt. % to about 80 wt. %, about 10 wt. % to about 90 wt. %, about 10 wt. % to about 99 wt. %, about 20 wt. % to about 30 wt. %, about 20 wt. % to about 40 wt. %, about 20 wt. % to about 50 wt. %, about 20 wt. % to about 60 wt. %, about 20 wt. % to about 70 wt. %, about 20 wt. % to about 80 wt. %, about 20 wt. % to about 90 wt. %, about 20 wt. % to about 99 wt. %, about 30 wt. % to about 40 wt. %, about 30 wt. % to about 50 wt. %, about 30 wt. % to about 60 wt. %, about 30 wt. % to about 70 wt. %, about 30 wt. % to about 80 wt. %, about 30 wt. % to about 90 wt. %, about 30 wt. % to about 99 wt. %, about 40 wt. % to about 50 wt. %, about 40 wt. % to about 60 wt. %, about 40 wt. % to about 70 wt. %, about 40 wt. % to about 80 wt. %, about 40 wt. % to about 90 wt. %, about 40 wt. % to about 99 wt. %, about 50 wt. % to about 60 wt. %, about 50 wt. % to about 70 wt. %, about 50 wt. % to about 80 wt. %, about 50 wt. % to about 90 wt. %, about 50 wt. % to about 99 wt. %, about 60 wt. % to about 70 wt. %, about 60 wt. % to about 80 wt. %, about 60 wt. % to about 90 wt. %, about 60 wt. % to about 99 wt. %, about 70 wt. % to about 80 wt. %, about 70 wt. % to about 90 wt. %, about 70 wt. % to about 99 wt. %, about 80 wt. % to about 90 wt. %, about 80 wt. % to about 99 wt. %, or about 90 wt. % to about 99 wt. % binder based on total weight of the total weight of the large pore zeolitic catalyst.

A large pore zeolitic catalyst (including optional binder) may be calcined, reduced (e.g., in $H_2$), and/or sulfided according to methods well known in the art.

As will be shown in the Examples, some large pore zeolitic catalysts disclosed herein may exhibit enhanced selectivity for heavier hydrocarbons (e.g., those boiling above about 650° F. (343° C.) as compared to lighter hydrocarbons. This may be particularly useful for maximizing the value of a VGO fraction derived from crude oil distillation. VGO is typically divided into two fractions. A lighter fraction is typically refined into fuel oils (e.g., gasoline, kerosene) and a heavier fraction is typically diverted for use as a lubricant. In order to meet various specifications, the $T_{95}$ of a VGO fraction diverted to a lubricant pool is typically limited to less than about 720° F. (382° C.). Similarly, in order to meet various specifications, the $T_5$ of a VGO fraction diverted for refining into fuel is limited to not less than about 650° F. (343° C.) or about 680° F. (360° C.). What remains is a VGO fraction that boils at a temperature ranging from about 680° F. (360° C.) and about 720° F. (382° C.) and can be difficult to incorporate into either the distillate fuel or the lubricant pool.

One option for utilizing hydrocarbons boiling at a temperature ranging from about 650° F. (343° C.) and about 720° F. (382° C.) (or 680° F. (360° C.) to 720° F. (382° C.)) is to incorporate it into the fraction that is diverted for refining into fuels and then hydrocrack the combined fraction. This converts the 650° F.+/680° F.+ (343° C.+/360° C.+) fraction to a lower boiling range fraction that complies with distillate fuel standards. Unfortunately, conventional hydrocracking that converts the 650° F.+/680° F.+ (343° C.+/360° C.+) fraction also results in substantial conversion of the 650° F.−/680° F.− (343° C.−/360° C.−) fraction into products having a boiling range too low to meet fuel distillate standards. Advantageously, since some embodiments of large pore zeolitic catalysts disclosed herein exhibit selectivity for hydrocracking heavier hydrocarbons, such large pore zeolitic catalysts may be utilized in converting hydrocarbons having a $T_5$ value of about 650° F. (343° C.) to 720° F. (382° C.) (or 680° F. (360° C.) to 720° F. (382° C.)) into a lower boiling fraction for incorporation into a fuel distillate pool. As used herein, the process of selectively converting heavier hydrocarbons over lighter hydrocarbons is referred to as "endpoint reduction." In any embodiment, "endpoint reduction" may occur when the ratio of the percent conversion of the fraction of the hydrocarbon feed stream that boils at a temperature equal to or greater than 343° C. (higher boiling fraction) to percent conversion of the fraction of the hydrocarbon feed stream that boils at a temperature equal to or greater than 177° C. (lower boiling fraction) is greater than 1. For example, the large pore zeolitic catalysts as described herein may be used to selectively convert the higher boiling fraction such that the ratio of percent conversion of the higher boiling fraction to percent conversion of the lower boiling fraction is greater than 3.5.

While not wishing to be bound by theory, it is believed that selective conversion of the 650° F.+/680° F.+ (343° C.+/360° C.+) fraction may be due to the presence of pores large enough to allow free diffusion of hydrocarbons in this boiling range into and out of the pores. In addition to reducing a diffusion barrier, selectivity for hydrocracking larger hydrocarbon may also require the absence of strong acid sites for adsorption because larger molecules tend to have a higher energy of physical absorption than smaller molecules and thus would selectively absorb to a surface and react over smaller molecules. Si-EMM-23 meets both of these conditions.

EXAMPLE EMBODIMENTS

One nonlimiting example embodiment is a method for converting hydrocarbons comprising providing a large pore zeolitic catalyst comprising a large pore zeolite; and contacting a hydrocarbon feed stream with the large pore zeolitic catalyst under conditions effective to convert the hydrocarbon feed stream to a hydrocarbon product stream that is characterized by a $T_{95}$ distillation temperature that is lower than the $T_{95}$ distillation temperature of the hydrocarbon feed stream. Optionally, the embodiment may further include one or more of the following Elements: Element 1: the method wherein the hydrocarbon feed stream comprises a fraction characterized by a $T_5$ distillation temperature of at least 350° F. (177° C.) and a higher boiling fraction having a $T_5$ of at least 650° F. (343° C.); Element 2: the method wherein the conditions effective include a temperature of at least about 315° C. and a pressure of at least 1115 psig (7.688 MPa); Element 3: the method wherein the large pore zeolite comprises pores defined by rings greater than 12 tetrahedral atoms; Element 4: the method wherein the large pore zeolite comprises pores defined by rings greater than 14 tetrahedral atoms; Element 5: the method wherein the large pore zeolite comprises pores defined by rings of 21 or more tetrahedral atoms; Element 6: the method wherein the large pore zeolite comprises pores greater than 8 Å in diameter in at least one dimension; Element 7: the method wherein the large pore zeolite comprises pores greater than 10 Å in diameter in at least one dimension; Element 8: the method wherein the large pore zeolite comprises the empirical chemical formula $(X_2O_3)_m(YO_2)_n$, m is at least about 10, X is a trivalent element selected from one or more of B, Al, Fe, and Ga, and Y is a tetravalent element selected from one or more of Si, Ge, Sn, Ti, or Zr; Element 9: the method wherein the large pore zeolite is EMM-23; Element 10: the method wherein the large pore zeolite has an empirical chemical formula of $(X_2O_3)_m(YO_2)_n$ where n is an integer greater than zero and m is substantially zero; Element 11: the method wherein the ratio of the percent conversion of the fraction of the hydrocarbon feed stream that boils at 343° C. to the percent conversion of the fraction of the hydrocarbon feed stream that boils at 177° C. is greater than 1; Element 12: the method wherein the ratio of the percent conversion of the fraction of the hydrocarbon feed stream that boils at 343° C. to the percent conversion of the fraction of the hydrocarbon feed stream that boils at 177° C. is greater than 3.5; Element 13: the method wherein the large pore zeolitic catalyst further comprises one or more of the following metals: a Group 2 metal, a Group 3 metal, a Group 4 metal, a Group 5 metal, a Group 6 metal, a Group 7 metal, a Group 8 metal, a Group 9 metal, a Group 10 metal, a Group 11 metal, a Group 12 metal, a Group 13 metal, a Group 14 metal, a Group 15 metal, a lanthanide, yttrium, and scandium; Element 14: Element 13 wherein the metal comprises platinum; Element 15: Element 13 wherein the metal is present in the large pore zeolitic catalyst from about 0.05 wt. % to about 5 wt. %, based on the total weight of the large pore zeolitic catalyst; and Element 16: the method wherein the wt. % of hydrocarbons having a $T_5$ value of at least 177° C. and a $T_{95}$ value less than about 343° C. in the product stream is greater than the wt. % of hydrocarbons having a $T_5$ value of at least 177° C. and a $T_{95}$ value less than about 343° C. in the hydrocarbon feed stream. Combinations of Elements include, but are not limited to, Element 1 in combination with one or more of Elements 2-16; Element 2 in combination with one or more of Elements 3-16; Element 3 in combination with one or more of Elements 4-16; Element 4 in combination with one or more of Elements 5-16; Element 5 in combination with one or more of Elements 6-16; Element 6 in combination with one or more of Elements 7-16; Element 7 in combination with one or more of Elements 8-16; Element 8 in combination with one or more of Elements 9-16; Element 9 in combination with one or more of Elements 10-16; Element 10 in combination with one or more of Elements 11-16; Element 11 in combination with one or more of Elements 12-16; Element 12 in combination with one or more of Elements 13-16; Element 13 (and optionally Element 14) in combination with one or more of Elements 15-16, and Element 10 in combination with Element 12.

Another nonlimiting embodiment is a system for converting hydrocarbons comprising at least one reactor, the reactor comprising a hydrocarbon feed stream inlet arranged and configured to convey a hydrocarbon feed stream into the reactor; a hydrocarbon product stream outlet arranged and configured to convey a hydrocarbon product stream out of the reactor; and at least one catalyst bed comprising at least one large pore zeolitic catalyst, wherein the large pore zeolitic catalyst comprises a large pore zeolite. The embodiment may be further combined with one or more of the following Elements: Element 17: the system wherein the large pore zeolite comprises pores defined by rings greater than 12 tetrahedral atoms; Element 18: the system wherein the large pore zeolite comprises pores defined by rings greater than 14 tetrahedral atoms; Element 19: the system wherein the large pore zeolite comprises pores defined by rings of 21 or more tetrahedral atoms; Element 20: the system wherein the large pore zeolite comprises pores greater than 8 Å in diameter in at least one dimension; Element 21: the system wherein the large pore zeolite comprises pores greater than 10 Å in diameter in at least one dimension; Element 22: the system wherein the large pore zeolite comprises pores defined by rings of 21 or more tetrahedral atoms; Element 23: the system wherein the large pore zeolite is EMM-23; Element 24: the system wherein the large pore zeolite comprises the empirical chemical formula $(X_2O_3)_m(YO_2)_n$, m is at least about 10, X is a trivalent element selected from one or more of B, Al, Fe, and Ga, and Y is a tetravalent element selected from one or more of Si, Ge, Sn, Ti, or Zr; Element 25: the system wherein the large pore zeolite has an empirical chemical formula of $(X_2O_3)_m(YO_2)_n$, n is an integer greater than zero and m is substantially zero; Element 26: the system wherein the large pore zeolitic catalyst further comprises one or more of the following metals: a Group 2 metal, a Group 3 metal, a Group 4 metal, a Group 5 metal, a Group 6 metal, a Group 7 metal, a Group 8 metal, a Group 9 metal, a Group 10 metal, a Group 11 metal, a Group 12 metal, a Group 13 metal, a Group 14 metal, a Group 15 metal, a lanthanide, yttrium, and scandium; Element 27: Element 26 wherein the metal comprises platinum; Element 28: Element 26 wherein the metal is present in the large pore zeolitic catalyst from about 0.05 wt. % to about 5 wt. %, based on the total weight of the large pore zeolitic catalyst. Combinations of Elements include, but are not limited to, Element 17 in combination with one or more of Elements 18-28; Element 18 in combination with one or more of Elements 19-28; Element 19 in combination with one or more of Elements 20-28; Element 20 in combination with one or more of Elements 21-28; Element 21 in combination with one or more of Elements 22-28; Element 22 in combination with one or more of Elements 23-28; Element 23 in combination with one or more of Elements 24-28; Element 24 in combination with one or more of Elements 25-28; Element 25 in combination with one or more of Elements 26-28; and Element 26 in combination with one or more of Elements 27-28.

In view of the above description and the Examples below, one of ordinary skill in the art will be able to practice the invention as claimed without undue experimentation. The foregoing will be better understood with reference to the following examples. All references made to these examples are for the purposes of illustration. The following examples should not be considered exhaustive, but merely illustrative of only a few of the many aspects and embodiments contemplated by the present disclosure.

EXAMPLES

Example 1: Preparation of Pt/Si-EMM-23. 65 g of tetramethyl orthosilicate (TMOS) was added with stirring to 229 g of a 15.68 wt. % solution of 1,1'-(pentane-1,5-diyl)bis(1-propylpyrrolidinium) hydroxide. The solution was covered and stirred for 3 days. After 3 days, the solution was placed in a mixer (FlackTec SpeedMixer™) and stirred for 10 minutes at 2000 rpm. The containing vessel and solution were weighed and placed in a freeze drier to remove water. After the freeze-drying, the vessel and its contents were weighed to determine mass loss. To achieve a molar ratio of $H_2O:SiO_2$ of 5, 60 g of water was added. 1% seeds (on a per silica basis) of EMM-23 was then added to the mixture, and the mixture was then placed in the mixer (FlackTec SpeedMixer™) to obtain a homogeneous gel. The gel was placed in a 300 cm³ spiral autoclave and crystallized at 150° C. for 10 days, mixing at a rate of 180 rpm. After crystallization, the product was isolated by centrifugation, the aqueous portion was decanted, and then the solids were re-dispersed in deionized water. This was repeated three to five times to isolate the solid product, which was dried in an oven at 90° C.-100° C. overnight. The sample was then calcined in a box furnace in a staged procedure. The sample was exposed to flowing nitrogen for two hours at room temperature, followed by a ramp from room temperature to 400° C. over a two-hour period while remaining under nitrogen flow. The temperature then remained at 400° C. for 15 minutes and then the atmosphere was switched from flowing nitrogen to flowing dried air. The temperature was then ramped from 400° C. to 540° C. over a one-hour period. The temperature remained at 540° C. for 16 hours and then the box furnace was allowed to cool to produce EMM-23 having a chemical formula of $SiO_2$ (Si-EMM-23). Analyzed samples of Si- EMM-23 had a surface area (BET) of 851 m²/g and a micropore volume of 0.33 cc/g. The Si-EMM-23 crystal was extruded with alumina (Versal™ 300) at a zeolite:binder ratio of 65:35 (35 wt. % binder) into a 1/16 inch quadrulobe. The extrudate was impregnated with a tetraamineplatinum (II) nitrate to achieve a platinum loading of 0.6 wt. % and then calcined for 3 hours at 680° F.

Example 2: Preparation of Pt/Al-EMM-23. 133.5 g of tetramethyl orthosilicate (TMOS) was added with stirring to 462.3 g of a 15.68 wt. % solution of 1,1'-(pentane-1,5-diyl) bis(1-propylpyrrolidinium) hydroxide and 4.15 g of a 15 wt. % aluminum nitrate in a plastic beaker. The solution was covered and stirred for 3 days. After 3 days, the solution was placed in a mixer (FlackTec SpeedMixer™) and stirred for 10 minutes at 2000 rpm. The containing vessel and solution were weighed and placed in a freeze drier to remove water. After the freeze-drying, the vessel and its contents were weighed to determine mass loss. To achieve a molar ratio of $H_2O:SiO_2$ of 5, 8.5 g of water was added. Seeds of EMM-23 (1% on a per silica basis) were then added to the mixture, and the mixture was then placed in the mixer (FlackTec SpeedMixer™) to obtain a homogeneous gel. The gel was placed in a 300 cm³ spiral autoclave and crystallized at 150° C. for 10 days, mixing at a rate of 180 rpm. The sample was then calcined in a box furnace in a staged procedure. The sample was exposed to flowing nitrogen for two hours at room temperature, followed by a ramp from room temperature to 400° C. over a two-hour period while remaining under nitrogen flow. The temperature then remained at 400° C. for 15 minutes and then the atmosphere was switched from flowing nitrogen to flowing dried air. The temperature was then ramped from 400° C. to 540° C. over a one-hour period. The temperature remained at 540° C. for 16 hours and then the box furnace was allowed to cool to produce a solid. 20.2 g of that solid was added to an aqueous solution of 1 M aluminum nitrate (303 mL) in a 1000 mL round bottom flask and heated at 75° C. for 4 hours. The product was then recovered by filtration and washed with about 1200 mL of deionized water. The recovered solids were then dried in an oven at 95° C. overnight to yield 20.9 g of Al-EMM-23 with a chemical formula of $27SiO_2:Al_2O_3$. Samples of Al-EMM-23 had a measured alpha value of 12, a surface area (BET) of 797 m²/g, and a micropore volume of 0.30 cc/g. The Al-EMM-23 crystal was extruded with alumina (Versal™ 300) at a zeolite:binder ratio of 65:35 (35 wt. % binder) into a 1/16 inch quadrulobe. Finally, the extrudate was impregnated with a tetraamineplatinum(II) nitrate to achieve a platinum loading of 0.6 wt. %. The material was then calcined for 3 hours at 680° F.

Example 3: Hydrocarbon Feed Stream. To simulate a heavy feed that would be subjected to hydrocracking, a hydrotreated distillate product was blended with 20 wt. % of a Group III base stock. The boiling range of the resultant hydrocarbon feed stream is shown below in Table 3 below. The hydrocarbon feed stream has <10 ppm sulfur and <5 ppm nitrogen (i.e., a sweet feedstock).

TABLE 3

| Boiling Fraction | Temperature |
| --- | --- |
| Initial BP | 131° C. (278° F.) |
| $T_5$ | 201° C. (394° F.) |
| $T_{10}$ | 223° C. (433° F.) |
| $T_{25}$ | 261° C. (502° F.) |
| $T_{50}$ | 301° C. (574° F.) |
| $T_{75}$ | 342° C. (648° F.) |
| $T_{90}$ | 378° C. (712° F.) |

TABLE 3-continued

| Boiling Fraction | Temperature |
| --- | --- |
| $T_{95}$ | 401° C. (754° F.) |
| $T_{99.5}$ | 497° C. (927° F.) |

A fixed-bed reactor was run at 1115 psig (7689 kPa) with a hydrogen flow equivalent to about 3000 scf/B (534.3 m³/m³). Temperatures were varied from 315° C. to 371° C. As understood by those of skill in the art, specifying an amount of conversion relative to a conversion temperature is a method for specifying the severity of reaction conditions independent of the nature of the particular feed. Thus, specifying an amount of conversion is commonly used as an alternative to specifying conditions such as temperature and pressure when specifying reaction severity. In this discussion, the amount of conversion relative to a conversion temperature (such as 177° C. or 343° C.) is defined based on the difference between the weight of the effluent that boils above the conversion temperature and the weight of the feed that boils above the conversion temperature. This difference is divided by the weight of the feed that boils above the conversion temperature to produce a normalized value (i.e., a weight percent based on the portion of the feed that boils above the conversion temperature). Catalysts prepared according to Examples 1-8 were run at the following space velocities:

Amorphous: Pt on Si/Al: 0.6 wt. % Pt, 1.65 hour$^{-1}$ WHSV

Zeolite: Pt/USY, Si—Pt/EMM-23, Al—Pt/EMM-23: 0.6 wt. % Pt, 1.65 hour$^{-1}$ WHSV Example 4. The hydrocarbon feed stream described in Table 3 is conveyed through a fixed-bed continuous flow reactor (about 1 g catalyst, WHSV listed above) held at about 315° C. using to demonstrate conversion of the 350° F.+ (177° C.+) and 650° F.+ (343° C.+) fractions of a hydrocarbon feed stream by example large pore zeolitic catalysts Pt/Si-EMM-23 and Pt/Al-EMM-23. Results are shown in FIG. 2. In particular, Pt/Al-EMM-23 appears to exhibit conversion activity that rivals the conversion activity of Pt on Si/Al and Pt+USY zeolite. FIG. 3 illustrates the ratio of 650° F.+ (343° C.+) fraction conversion to 350° F.+ (177° C.+) fraction conversion. Notably, the large pore zeolitic catalyst, Pt/Si-EMM-23, though showing lower activity in FIG. 2, appears to exhibit higher selectivity for the 650° F.+ (343° C.+) fraction of the hydrocarbon feed stream.

Figure 2:
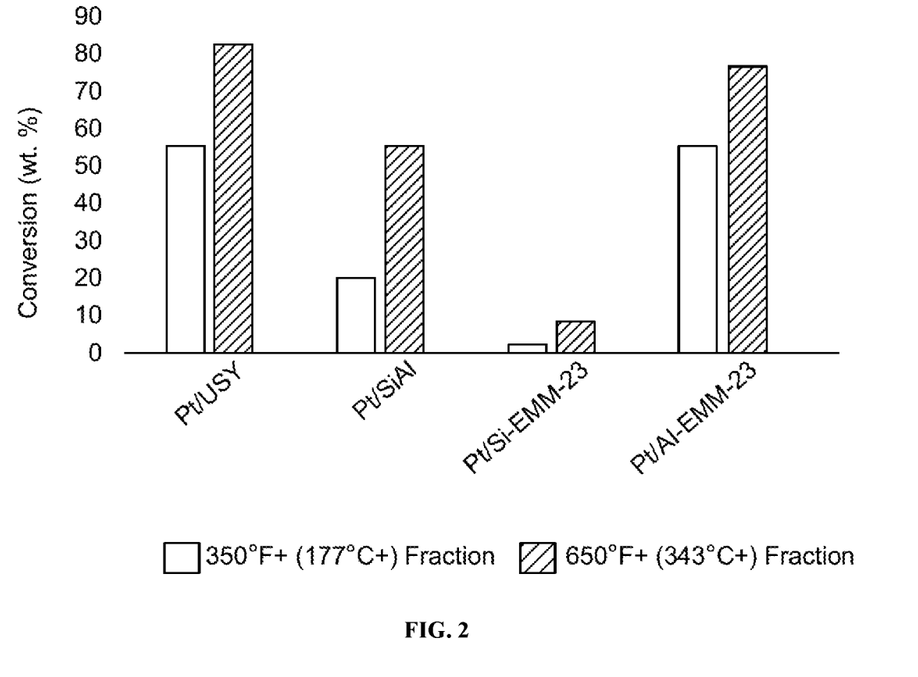
FIG. 2 illustrates data related to the effect of a large pore zeolitic catalyst, as described herein, on conversion of the 350° F.+ (177° C.+) fraction and 650° F.+ (343° C.+) fraction of a hydrocarbon feedstock, as discussed in the Examples.
Figure 3:
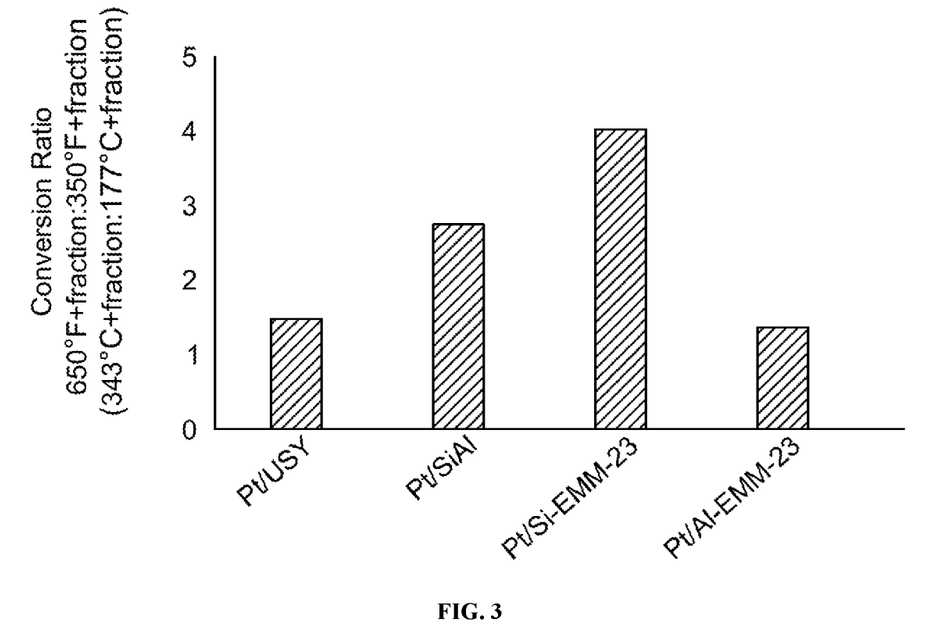
FIG. 3 presents the calculated ratio of the conversion of the 650° F.+ (343° C.+) fraction to the 350° F.+ (177° C.+) fraction of a hydrocarbon feedstock, using the same data as reported in FIG. 3.
Figure 4:
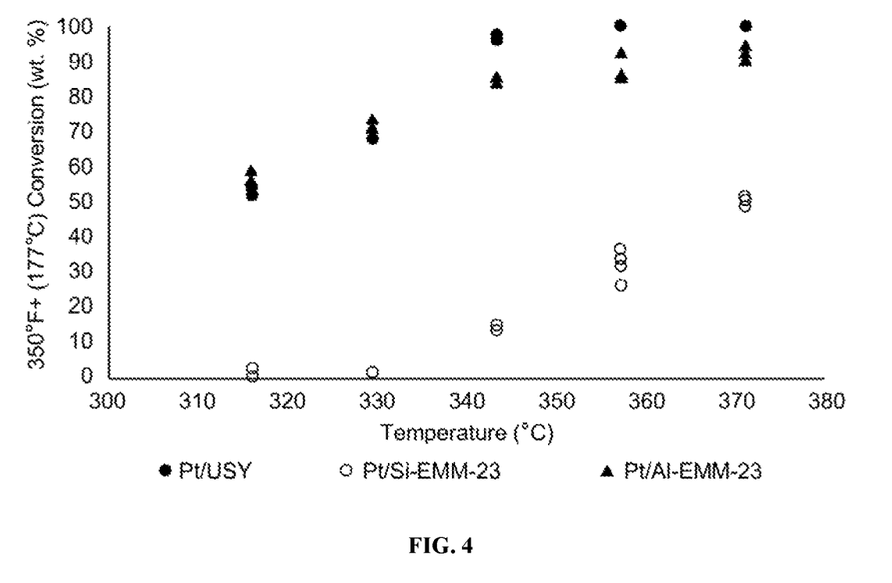
FIG. 4 illustrates data related to the effect of a large pore zeolitic catalyst, as described herein, on conversion of the 350° F.+ (177° C.+) fraction of a hydrocarbon feedstock with respect to temperature, as discussed in the Examples.

Example 5. The hydrocarbon feed stream described in Table 3 is conveyed through a fixed-bed continuous flow reactor to demonstrate conversion of a 350° F.+ (177° C.+) fraction across a wide range of reactor temperatures (315° C. to 371° C.). Pt/Si-EMM-23, Pt/Al-EMM-23 were compared to Pt+USY zeolite. Results are shown in FIG. 4. Pt/Al-EMM-23 is active across a wide range of temperatures. Pt/Si-EMM-23, although exhibiting low activity in the data in FIG. 2, appears to be able to convert about 50 wt. % of the 350° F.+ (177° C.+) fraction at temperatures above 371° C.

Figure 5:
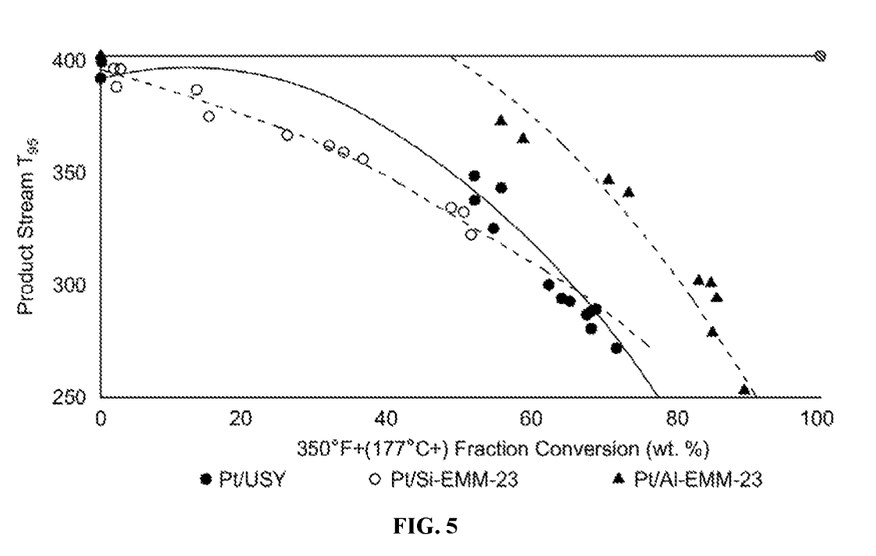
FIG. 5 presents data relating to the $T_{95}$ of a product stream as it relates to the percent of 350° F.+ (177° C.+) fraction of a hydrocarbon feedstock converted to the product stream.

Example 6. The hydrocarbon feed stream described in Table 3 is conveyed through a fixed-bed continuous flow reactor at various temperatures ranging from 315° C. to 371° C. FIG. 5 reports the $T_{95}$ of the resulting product stream plotted against the percent of the 350° F.+ (177° C.+) fraction that is converted for each of Pt+USY zeolite, Pt/Si-EMM-23, and Pt/Al-EMM-23. The horizontal line at the top of the graph represents the $T_{95}$ of the hydrocarbon feed stream (401° C.). As Pt/Si-EMM-23 appears to impart the lowest percent conversion at equivalent $T_{95}$ distillation temperatures, Pt/Si-EMM-23 emerges as a potential catalyst for endpoint reduction.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein.

What is claimed is:

1. A method for converting hydrocarbons comprising:
    contacting a hydrocarbon feed stream having a sulfur content of less than about 50 wppm with a first hydrocracking catalyst comprising USY zeolite, Pt on Si/Al, or combinations thereof at conditions effective to convert the hydrocarbon feed stream to an intermediate feed stream comprising a residual fraction which boils above 650° F. (343° C.) and a $C_4$-fraction, wherein the hydrocarbon feed stream comprises hydrocarbons having a $T_5$ value of at least about 392° F. (200° C.);
    separating the $C_4$-fraction from the intermediate feed;
    providing a large pore zeolitic catalyst comprising a large pore zeolite, wherein the large pore zeolite comprises PT/Si-EMM-23; and
    contacting the intermediate feed after separating the $C_4$-fraction with the large pore zeolitic catalyst under conditions effective to convert the residual fraction to a hydrocarbon product stream that is characterized by a T95 distillation temperature that is lower than the T95 distillation temperature of the residual fraction, wherein the ratio of the percent conversion of the fraction of the hydrocarbon feed stream that boils at 343° C. to the percent conversion of the fraction of the hydrocarbon feed stream that boils at 177° C. is greater than +3.5.

2. The method as in claim 1, wherein the conditions effective include a temperature of at least about 315° C. and a pressure of at least 1115 psig (7.688 MPa).

3. The method as in claim 1, wherein the large pore zeolite comprises pores defined by rings greater than 12 tetrahedral atoms.

4. The method as in claim 1, wherein the large pore zeolite comprises pores defined by rings greater than 14 tetrahedral atoms.

5. The method as in claim 1, wherein the large pore zeolite comprises pores defined by rings of 21 or more tetrahedral atoms.

6. The method as in claim 1, wherein the large pore zeolite comprises pores greater than 8 Å in diameter in at least one dimension.

7. The method as in claim 1, wherein the large pore zeolite comprises pores greater than 10 Å in diameter in at least one dimension.

8. The method as in claim 1, wherein the large pore zeolite comprises the empirical chemical formula $(X2O3)_m(YO2)_n$, m is at least about 10, X is a trivalent element selected from one or more of B, Al, Fe, and Ga, and Y is a tetravalent element selected from one or more of Si, Ge, Sn, Ti, or Zr.

9. The method as in claim 1, wherein the large pore zeolite has an empirical chemical formula of $(X2O3)_m(YO2)_n$ where n is an integer greater than zero and m is substantially zero.

10. The method as in claim 1, wherein the large pore zeolitic catalyst further comprises one or more of the following metals: a Group 2 metal, a Group 3 metal, a Group 4 metal, a Group 5 metal, a Group 6 metal, a Group 7 metal, a Group 8 metal, a Group 9 metal, a Group 10 metal, a Group 11 metal, a Group 12 metal, a Group 13 metal, a Group 14 metal, a Group 15 metal, a lanthanide, yttrium, and scandium.

11. The method as in claim 10, wherein the metal is present in the large pore zeolitic catalyst from about 0.05 wt. % to about 5 wt. %, based on the total weight of the large pore zeolitic catalyst.

12. The method as in claim 1, wherein the wt. % of hydrocarbons having a T5 value of at least 177° C. and a T95 value less than about 343° C. in the product stream is greater than the wt. % of hydrocarbons having a T5 value of at least 177° C. and a T95 value less than about 343° C. in the hydrocarbon feed stream.

13. A system for converting hydrocarbons comprising at least one reactor, the reactor comprising:
    a hydrocarbon feed stream inlet arranged and configured to convey a hydrocarbon feed stream into the reactor, wherein the hydrocarbon feed stream has a sulfur content of less than about 50 wppm;
    a hydrocarbon product stream outlet arranged and configured to convey a hydrocarbon product stream out of the reactor;
    a first catalyst bed comprising a first hydrocracking catalyst comprising USY zeolite, Pt on Si/Al, or combinations and a second catalyst bed comprising at least one large pore zeolitic catalyst comprising Pt/Si-EMM-23; and
    a separation stage between the first catalyst bed and second catalyst bed configured to separate a $C_4$-fraction,
    wherein the second catalyst bed is configured to convert a residual fraction from the separation stage at conditions effective to produce the hydrocarbon product stream, wherein the hydrocarbon product stream is characterized by a T95 distillation temperature that is lower than the T95 distillation temperature of the residual fraction, and wherein the ratio of the percent conversion of the fraction of the hydrocarbon feed stream that boils at 343° C. to the percent conversion of the fraction of the hydrocarbon feed stream that boils at 177° C. is greater than 3.5.

14. The system as in claim 13, wherein the large pore zeolite comprises pores defined by rings greater than 12 tetrahedral atoms.

15. The system as in claim 13, wherein the large pore zeolite comprises pores defined by rings greater than 14 tetrahedral atoms.

16. The system as in claim 13, wherein the large pore zeolite comprises pores defined by rings of 21 or more tetrahedral atoms.

17. The system as in claim 13, wherein the large pore zeolite comprises pores greater than 8 A in diameter in at least one dimension.

18. The system as in claim 13, wherein the large pore zeolite comprises pores greater than 10 Å in diameter in at least one dimension.

19. The system as in claim 13, wherein the large pore zeolite comprises the empirical chemical formula $(X2O3)_m$ $(YO2)_n$, m is at least about 10, X is a trivalent element selected from one or more of B, Al, Fe, and Ga, and Y is a tetravalent element selected from one or more of Si, Ge, Sn, Ti, or Zr.

20. The system as in claim 13, wherein the large pore zeolite has an empirical chemical formula of $(X2O3)_m$ $(YO2)_n$, n is an integer greater than zero and m is substantially zero.

21. The system as in claim 13, wherein the large pore zeolitic catalyst further comprises one or more of the following metals: a Group 2 metal, a Group 3 metal, a Group 4 metal, a Group 5 metal, a Group 6 metal, a Group 7 metal, a Group 8 metal, a Group 9 metal, a Group 10 metal, a Group 11 metal, a Group 12 metal, a Group 13 metal, a Group 14 metal, a Group 15 metal, a lanthanide, yttrium, and scandium.

22. The system as in claim 21, wherein the metal is present in the large pore zeolitic catalyst from about 0.05 wt. % to about 5 wt. %, based on the total weight of the large pore zeolitic catalyst.

23. The method of claim 1 wherein the hydrocarbon feed stream comprises a vacuum gas oil characterized by a $T_5$ distillation temperature at a point in a range of about 644° F. (340° C.) to about 662° F. (350° C.) and a $T_{95}$ distillation temperature at a point in a range of about 1030° F. (555° C.) to about 1058° F. (570° C.).

24. The method of claim 1, wherein the ratio is greater than 4.0.

25. The system of claim 13, wherein the ratio is greater than 4.0.

* * * * *